United States Patent
Hsieh (10) Patent No.: US 12,055,245 B2
(45) Date of Patent: Aug. 6, 2024

(54) C-CLIP

(71) Applicant: KABO Tool Company, Taichung (TW)

(72) Inventor: Chih-Ching Hsieh, Taichung (TW)

(73) Assignee: KABO Tool Company, Taichung (TW)

( * ) Notice: Subject to any disclaimer, the term of this patent is extended or adjusted under 35 U.S.C. 154(b) by 366 days.

(21) Appl. No.: 17/654,082

(22) Filed: Mar. 9, 2022

(65) Prior Publication Data

US 2022/0373115 A1 Nov. 24, 2022

(30) Foreign Application Priority Data

May 21, 2021 (TW) .................................. 110118458

(51) Int. Cl.
*B25B 27/20* (2006.01)
*F16B 21/18* (2006.01)
*F16L 21/08* (2006.01)

(52) U.S. Cl.
CPC .................................. *F16L 21/08* (2013.01)

(58) Field of Classification Search
CPC ......... F16L 21/08; F16B 21/18; F16B 21/183; F16B 21/186
USPC .................................. 411/517, 518, 520, 521
See application file for complete search history.

(56) References Cited

U.S. PATENT DOCUMENTS

| 2,886,382 A | * | 5/1959 | Baublys | F16B 21/18 384/537 |
| 3,469,494 A | * | 9/1969 | Frailly | F16B 21/183 411/517 |
| 3,535,977 A | * | 10/1970 | Baumgarten | F16B 21/186 403/247 |

FOREIGN PATENT DOCUMENTS

| FR | 2547371 A1 | * | 12/1984 | B25B 27/205 |
| GB | 1478311 A1 | * | 6/1977 | F16B 21/183 |
| WO | WO-2015117997 A1 | * | 8/2015 | F16B 21/183 |

OTHER PUBLICATIONS

WO2015117997A1 WPO Claim Translation (Year: 2015).*
WO2015117997A1 WPO Description Translation (Year: 2015).*

* cited by examiner

*Primary Examiner* — William D Hutton, Jr.
*Assistant Examiner* — Carl J Carlson
(74) *Attorney, Agent, or Firm* — Wang Law Firm, Inc.

(57) ABSTRACT

A C-clip includes a C-shaped clip body and two peripherally open holes. The clip body can be opened and closed elastically. The peripherally open holes are provided on two lateral sides of the clip body respectively and are adjacent to or located at the two ends of the clip body respectively. The peripherally open holes are provided in the clip body and each have a communication opening and a closed end. A wall between the communication opening and the closed end of each peripherally open hole forms a stop edge for preventing a tip of a retaining ring plier from moving out of the peripherally open hole. The outer diameter of the clip body can be changed by applying forces to the clip body via the peripherally open holes respectively. As the clip body does not have any particularly protruding portion, the C-clip can be used in various situations.

10 Claims, 7 Drawing Sheets

C-CLIP

BACKGROUND OF THE INVENTION

1. Technical Field

The present invention relates to a retaining device and more particularly to a C-clip with peripherally open holes.

2. Description of Related Art

Figure 1:
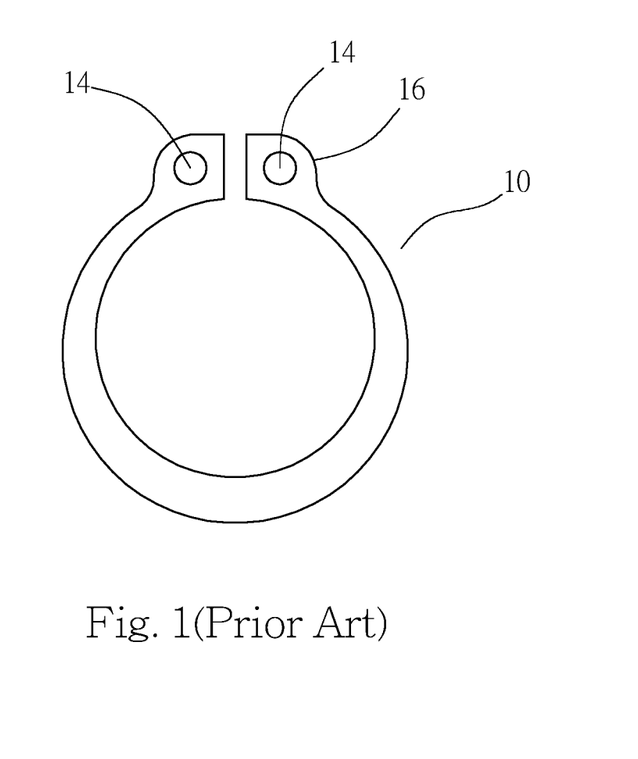
FIG. 1 is a top view of a conventional C-clip.
Figure 2:
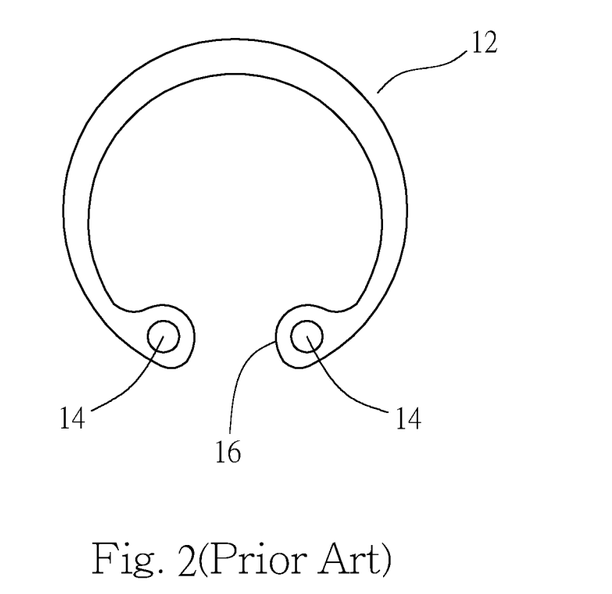
FIG. 2 is a top view of another conventional C-clip.

C-clips are devices designed to prevent a shaft or machine part from moving. FIG. 1 shows an externally mounted, or external, C-clip 10 while FIG. 2 shows an internally mounted, or internal, C-clip 12. The two ends of each of the C-clips 10 and 12 are each provided with a peripherally closed hole 14 so that the two tips of a retaining ring plier (not shown) can be respectively inserted into the two peripherally closed holes 14 of the C-clip 10 or 12 to either pull the C-clip 10 open or bring the two ends of the C-clip 12 closer to each other.

To form the peripherally closed holes 14, each of the two ends of the C-clip 10 or 12 is provided with a ring portion 16 that forms the periphery of the corresponding peripherally closed hole 14.

As can be seen in the drawings, the outer diameter of each ring portion 16 of the C-clip 10 is greater than the width of the C-clip, making the ring portions 16 two significantly protruding portions. When the C-clip 10 or 12 is fitted around or in an object, therefore, the protruding ring portions 16 give rise to limitations or inconvenience of use.

BRIEF SUMMARY OF THE INVENTION

The present invention aims to solve the aforesaid problem, the primary objective being to provide a C-clip that does not have protruding portions but still can be easily operated with a retaining ring plier.

To achieve the foregoing objective, the C-clip provided by the present invention includes a C-shaped clip body and two peripherally open holes.

The C-shaped clip body can be opened and closed elastically and has two ends.

The two peripherally open holes are provided on two lateral sides of the clip body respectively and are adjacent to or located at the two ends of the clip body respectively. The outer diameter of the clip body can be changed by applying forces to the clip body via the two peripherally open holes respectively.

Each peripherally open hole has a communication opening and a closed end. The communication opening of each peripherally open hole communicates with a periphery of the clip body. The closed end of each peripherally open hole has an outer wall, which is connected to the communication opening of the peripherally open hole and forms a stop edge.

As the clip body of the C-clip does not have any particularly protruding portion, the C-clip can be used in various situations. The two peripherally open holes allow insertion and operation by the two tips of a retaining ring plier to change the outer diameter of the C-clip. The stop edge of each peripherally open hole can prevent the corresponding tip of the retaining ring plier from moving out of the peripherally open hole.

In one preferred embodiment, the two peripherally open holes are provided on the two lateral sides of the clip body respectively in a symmetric manner.

In one preferred embodiment, the two peripherally open holes are provided at the outer periphery of the clip body, with their communication openings communicating with the outer periphery of the clip body. The two ends of the clip body are defined as the front side of the C-clip, and in one preferred embodiment, the closed end of each peripherally open hole is closer to the front side of the C-clip than is the communication opening of the peripherally open hole.

In one preferred embodiment, the two peripherally open holes are provided at the inner periphery of the clip body, with their communication openings communicating with the inner periphery of the clip body. The two ends of the clip body are defined as the front side of the C-clip, and in one preferred embodiment, the communication opening of each peripherally open hole is closer to the front side of the C-clip than is the closed end of the peripherally open hole.

In one preferred embodiment, each of the two peripherally open holes is provided in the clip body along a slanting direction.

In one preferred embodiment, each of the two lateral sides of the clip body is provided with a narrow portion. The two narrow portions are relatively-small-width portions of the clip body, are adjacent to the two peripherally open holes respectively, and are on the rear sides of the two peripherally open holes respectively.

BRIEF DESCRIPTION OF THE SEVERAL VIEWS OF THE DRAWINGS

The objectives, features, and intended effect of the present invention can be better understood by referring to the following description of some preferred embodiments in conjunction with the accompanying drawings, in which.

DETAILED DESCRIPTION OF THE INVENTION

Figure 3:
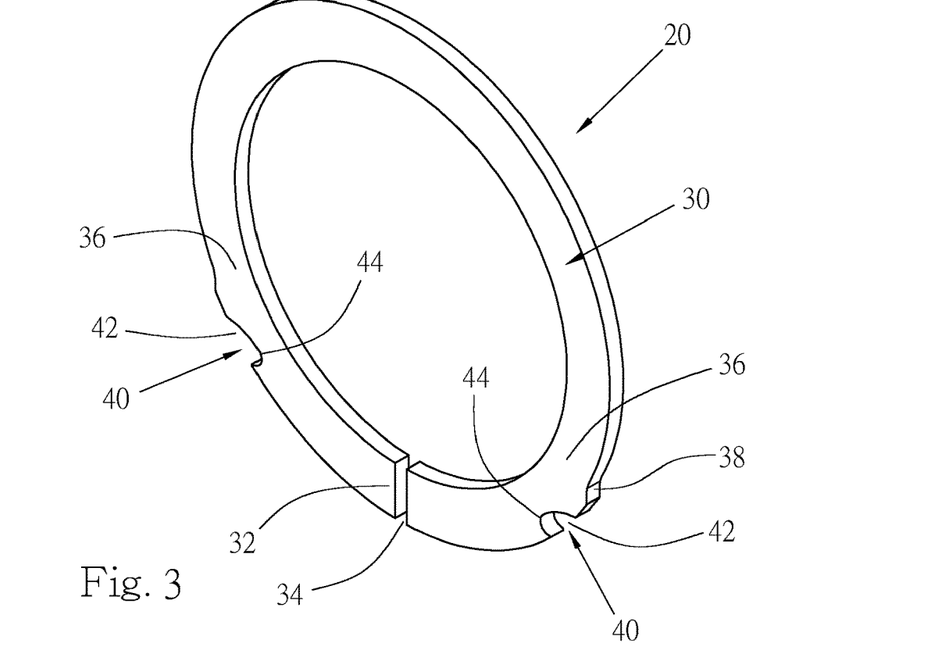
FIG. 3 is a perspective view of the C-clip according to the first preferred embodiment of the present invention.
Figure 4:
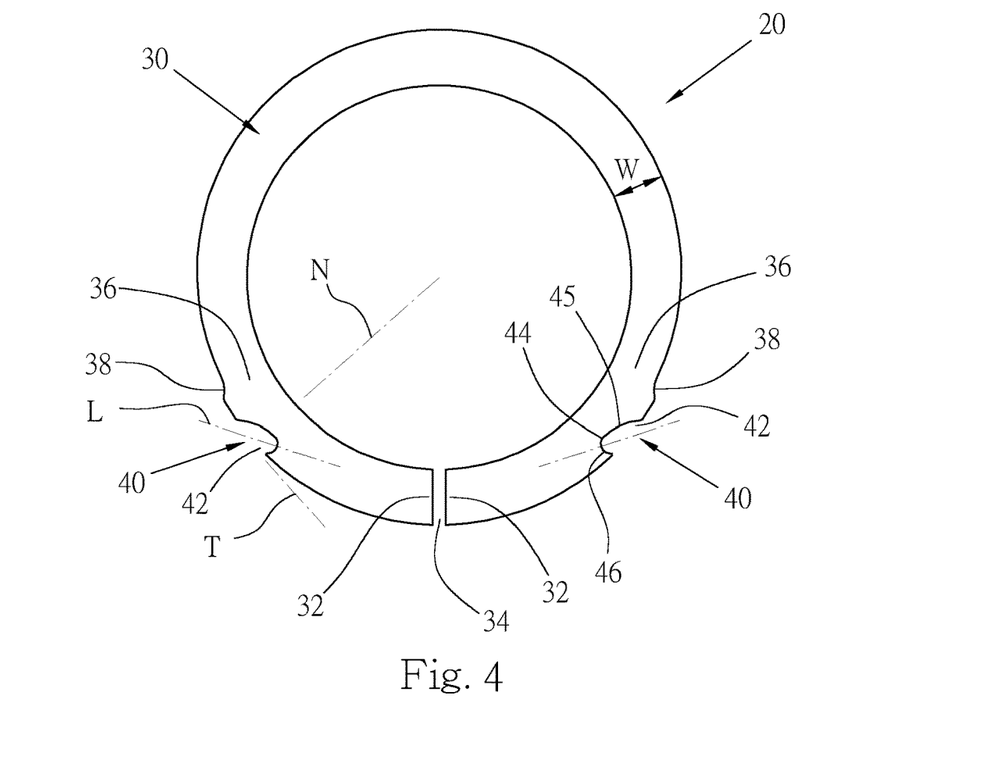
FIG. 4 is a top view of the C-clip in FIG. 3.

Referring to FIG. 3 and FIG. 4, the C-clip 20 according to the first preferred embodiment of the present invention includes a C-shaped clip body 30 and two peripherally open holes 40. The clip body 30 can be opened and closed elastically and has two opposing ends 32. The two ends 32 of the C-clip 20 are defined as the front side of the C-clip. The clip body 30 has a laterally symmetric configuration and two lateral sides. A gap 34 is formed between the two ends 32. As the clip body 30 can be opened and closed elastically, the outer diameter of the C-clip 20 can be changed.

The two peripherally open holes 40 are provided at the outer periphery of the clip body 30, are located on the two lateral sides of the clip body respectively, and are symmetrically disposed. The peripherally open holes 40 may be provided at the two ends 32 of the clip body 30 respectively or, as shown in FIG. 3, be adjacent to the two ends of the clip body 30 respectively. The outer diameter of the clip body 30 can be changed by applying inward forces to the clip body via the two peripherally open holes 40 respectively.

Each peripherally open hole 40 has a communication opening 42 and a closed end 44. In this preferred embodiment, the two peripherally open holes 40 are provided at the outer periphery of the clip body 30, so the communication openings 42 communicate with the outer periphery of the clip body 30. The outer side of each peripherally open hole 40 is defined herein as the side where the corresponding communication opening 42 is located. The closed end 44 of each peripherally open hole 40 has an inner wall 45 and an outer wall 46 located respectively on the inner and outer sides of the peripherally open hole 40 and both connected to the communication opening 42 of the peripherally open hole 40. The outer wall 46 of each peripherally open hole 40 forms a stop edge for preventing the corresponding tip of a retaining ring plier from moving out of the peripherally open hole 40 (as described further below).

The C-clip 20 in this embodiment is an internal C-clip and can have its outer diameter reduced. Moreover, the closed ends 44 are closer to the front side of the C-clip than are the centers of the communication openings 42, wherein the center of each communication opening 42 is defined as the center of the width of the communication opening 42.

As shown in FIG. 4, each of the two peripherally open holes 40 is provided in the clip body 30 along a slanting direction, wherein the slanting direction is a direction between the tangential direction T and the normal direction N at the center of the communication opening 42 of the peripherally open hole. More specifically, each of the two peripherally open holes 40 is provided in the clip body 30 generally along the direction of an inward force. The longitudinal direction L of each peripherally open hole 40 is defined by a line connecting the center of the communication opening 42 and the closed end 44 of the peripherally open hole 40 and lies between the tangential direction T and the normal direction N at the center of the communication opening 42. In this preferred embodiment, the direction from the communication opening 42 to the closed end 44 of each peripherally open hole 40 extends generally from the rear side of the C-clip 20 toward the front side of the C-clip 20.

In addition, the clip body 30 in this preferred embodiment has a uniform width W (which, however, is not necessary in practice) and two narrow portions 36. The two narrow portions 36 are provided on the two lateral sides of the clip body 30 respectively and are portions of the clip body 30 that have a relatively small width. The two narrow portions 36 are adjacent to the two peripherally open holes 40 respectively and are on the rear sides of the two peripherally open holes respectively. In this embodiment, the two lateral sides of the clip body 30 are each concavely provided with at least one recess 38 at the outer periphery of the clip body 30 so as to form the narrow portions 36. The two narrow portions 36 are intended to facilitate elastic deformation of the C-clip 20.

Figure 5:
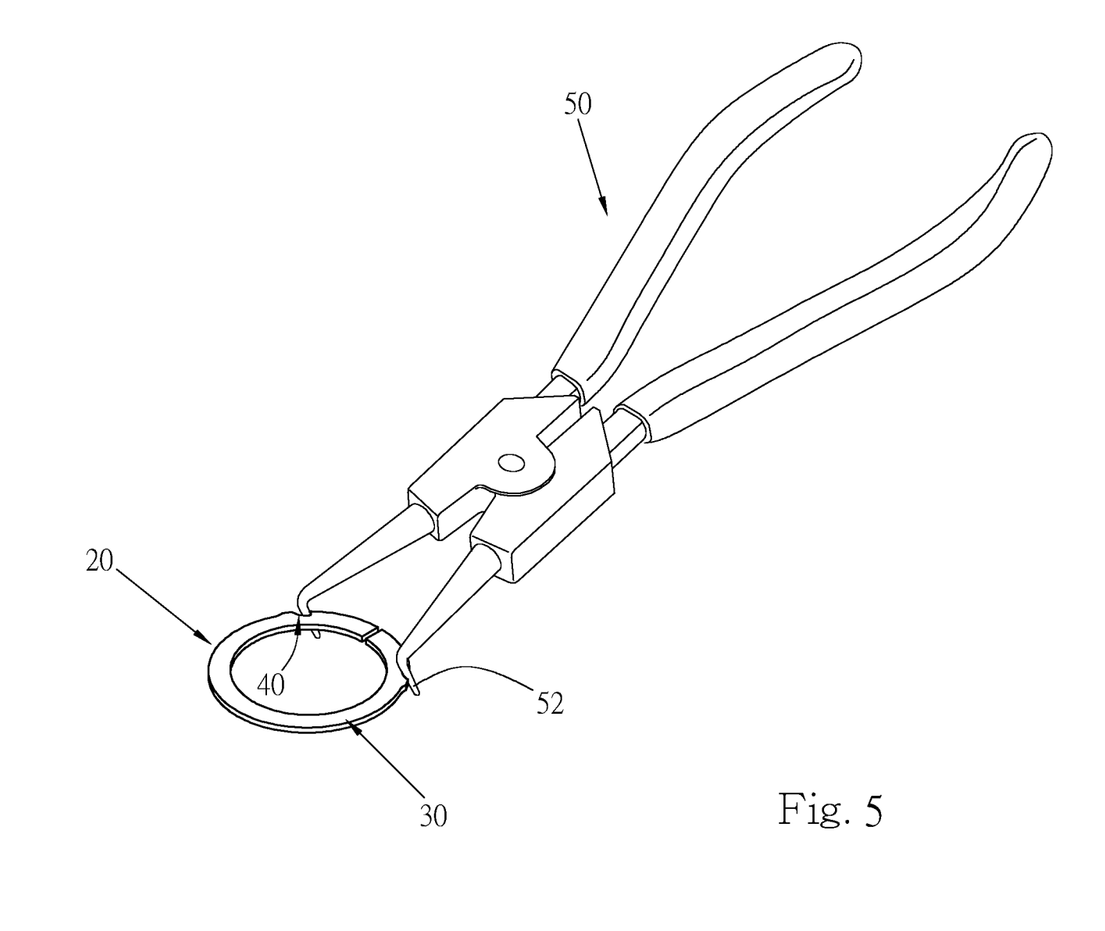
FIG. 5 shows the C-clip in FIG. 3 being operated with a retaining ring plier.
Figure 6:
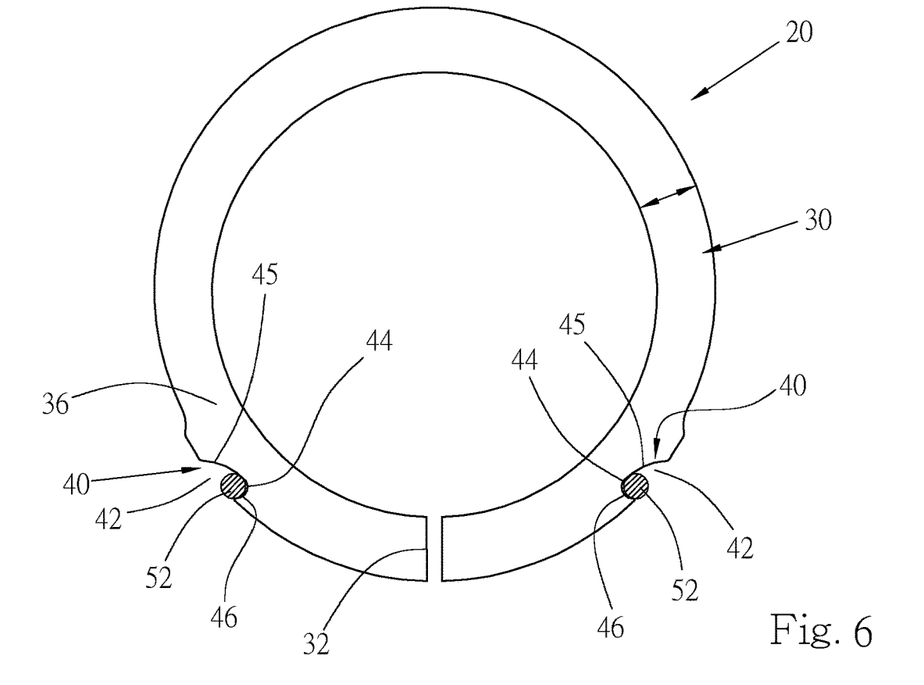
FIG. 6 is a sectional view taken along line 6-6 in FIG. 5.
Figure 7:
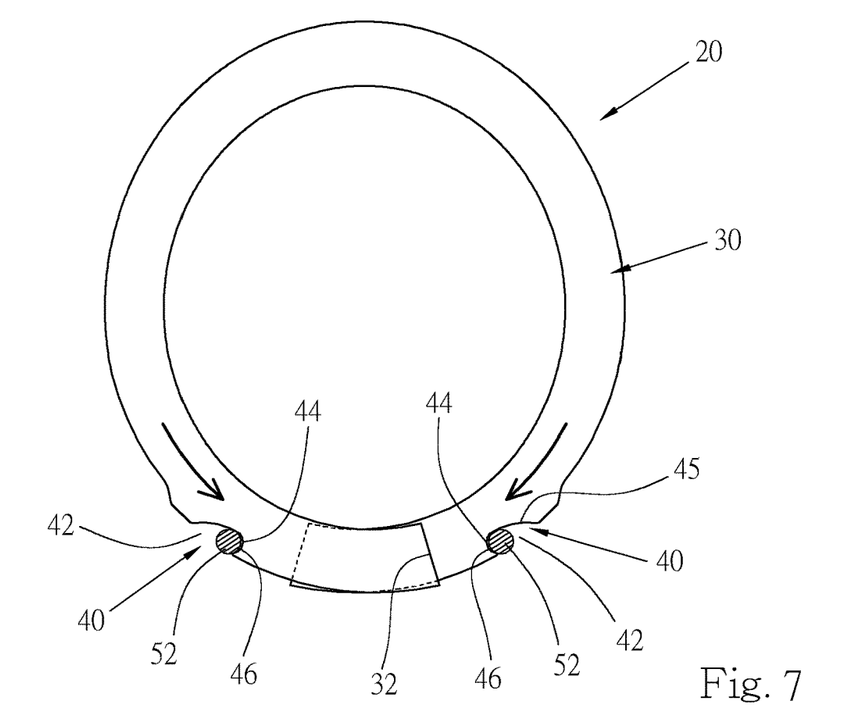
FIG. 7 is similar to FIG. 6 and shows a state of operation in which the outer diameter of the C-clip is being reduced.
Figure 8:
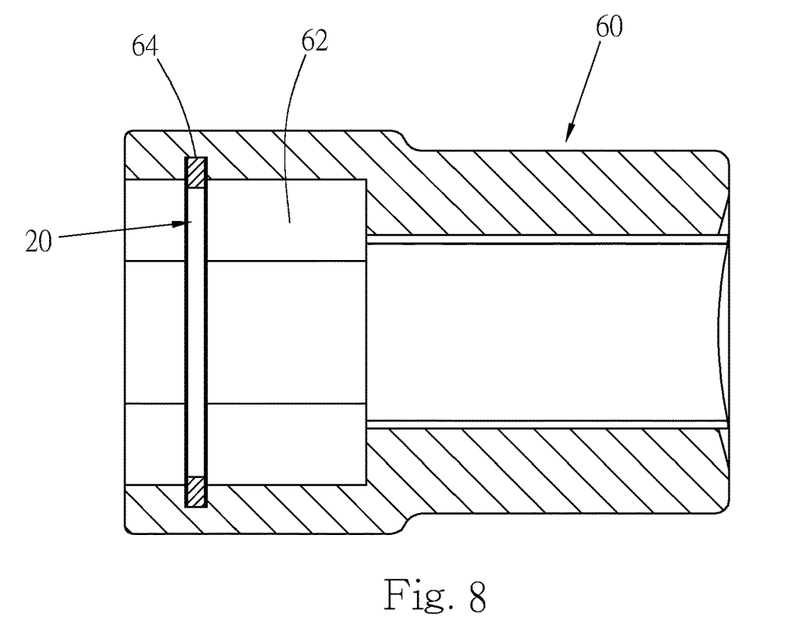
FIG. 8 is a sectional view showing the C-clip in FIG. 3 fitted in the hole of a socket.

To use, referring to FIG. 5 and FIG. 6, the two tips 52 of the claws of a retaining ring plier 50 are inserted into the two peripherally open holes 40 of the C-clip 20 respectively, and forces are applied through the plier to the C-clip 20 in order to change the outer diameter of the C-clip. Referring to FIG. 7, the outer diameter of the clip body 30 has been reduced by applying an inward pushing force through each of the two tips 52 so that the C-clip 20 can be moved into a hole of an object, e.g., the hole 62 of the socket 60 in FIG. 8. Once the inward pushing forces are removed, the C-clip 20 restores its original shape elastically and ends up fitted in the circumferential groove 64 in the hole 62.

Referring back to FIG. 7, when the outer diameter of the C-clip 20 is reduced by the retaining ring plier 50, the tips 52 of the retaining ring plier are stopped by the stop edges (i.e., the outer walls 46) of the peripherally open holes 40 respectively and are thus kept from escaping from the peripherally open holes 40 respectively. This ensures that the tips 52 will not separate from the C-clip 20 while the C-clip 20 is being squeezed by the retaining ring plier 50.

Figure 9:
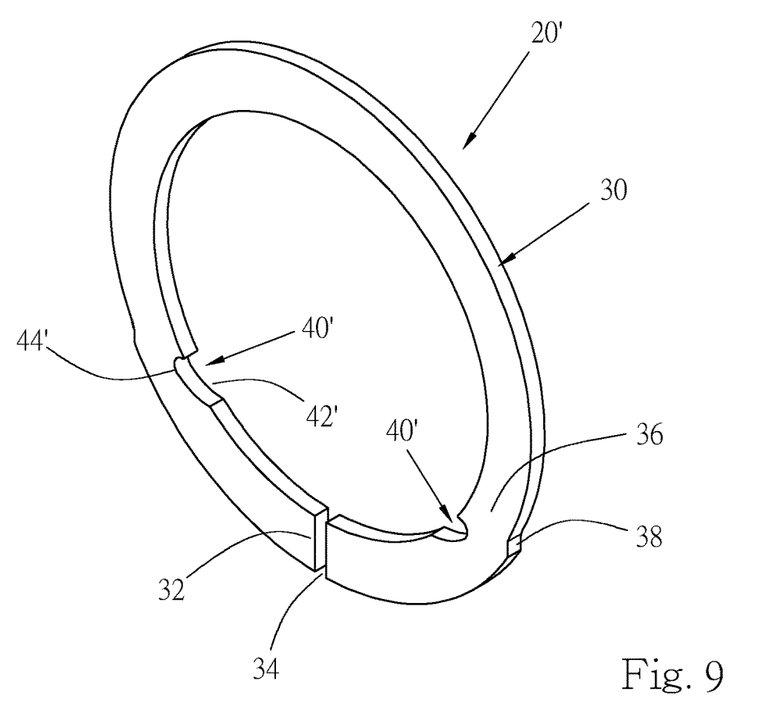
FIG. 9 is a perspective view of the C-clip according to the second preferred embodiment of the invention.
Figure 10:
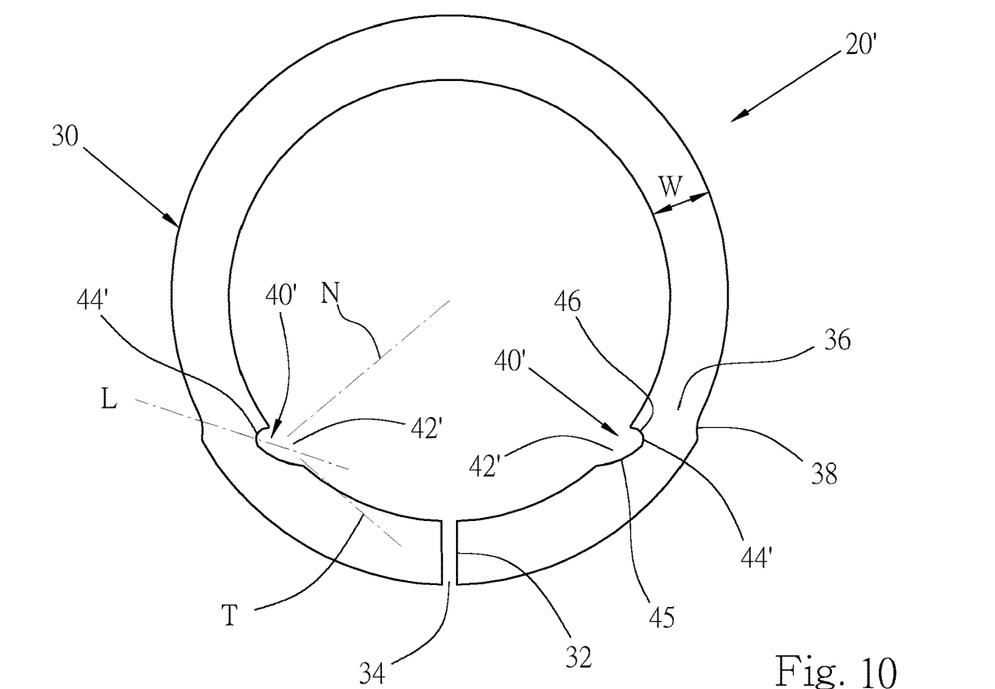
FIG. 10 is a top view of the C-clip in FIG. 9.

FIG. 9 and FIG. 10 show the C-clip 20' provided by the second preferred embodiment of the present invention. The same elements in the first and the second preferred embodiments are indicated by the same reference numeral. As does its counterpart in the first preferred embodiment, the C-clip 20' includes a C-shaped clip body 30 and two peripherally open holes 40'. The clip body 30 can be opened and closed elastically and has two ends 32. The two ends 32 of the C-clip 20' are the front side of the C-clip. A gap 34 is formed between the two ends 32.

The two peripherally open holes 40' are provided at the inner periphery of the clip body 30 and are located on the two lateral sides of the clip body respectively. As are their counterparts in the first preferred embodiment, the peripherally open holes 40' may be located at or adjacent to the two ends 32 of the clip body 30 respectively. The outer diameter of the clip body 30 can be changed by applying outward forces to the clip body via the two peripherally open holes 40' respectively.

In this preferred embodiment, the two peripherally open holes 40' are provided at the inner periphery of the clip body 30, so the communication openings 42' communicate with the inner periphery of the clip body 30. The outer side of each peripherally open hole 40' is defined herein as the side where the corresponding communication opening 42' is located, and each outer wall 46 connecting the corresponding closed end 44' and communication opening 42' forms a stop edge for preventing the corresponding tip of a retaining ring plier from moving out of the corresponding peripherally open hole 40'.

The C-clip 20' in this embodiment is an external C-clip and can have its outer diameter increased. The centers of the communication openings 42' are closer to the front side of the C-clip than are the closed ends 44'.

Referring to FIG. 10, each of the two peripherally open holes 40' is provided in the clip body 30 along a slanting direction, wherein the slanting direction is a direction between the tangential direction T and the normal direction N at the center of the communication opening 42' of the peripherally open hole. More specifically, each of the two peripherally open holes 40' is provided in the clip body 30 generally along the direction of an outward force. The longitudinal direction L of each peripherally open hole 40' is defined by a line connecting the center of the communication opening 42' and the closed end 44' of the peripherally open hole 40' and lies between the tangential direction T and the normal direction N at the center of the communication opening 42'. In this preferred embodiment, the direction from the communication opening 42' to the closed end 44' of each peripherally open hole 40' extends generally from the front side of the C-clip 20' toward the rear side of the C-clip 20'.

As in the first preferred embodiment, the clip body 30 in the second preferred embodiment has a uniform width W and two narrow portions 36. The two narrow portions 36 are provided on the two lateral sides of the clip body 30 respectively and are portions of the clip body 30 that have a relatively small width. The two narrow portions 36 are adjacent to the two peripherally open holes 40' respectively and are on the rear sides of the two peripherally open holes respectively. Each of the two lateral sides of the clip body 30 is provided with one recess 38 at the outer periphery of the clip body 30 in order to form the corresponding narrow portion 36.

Figure 11:
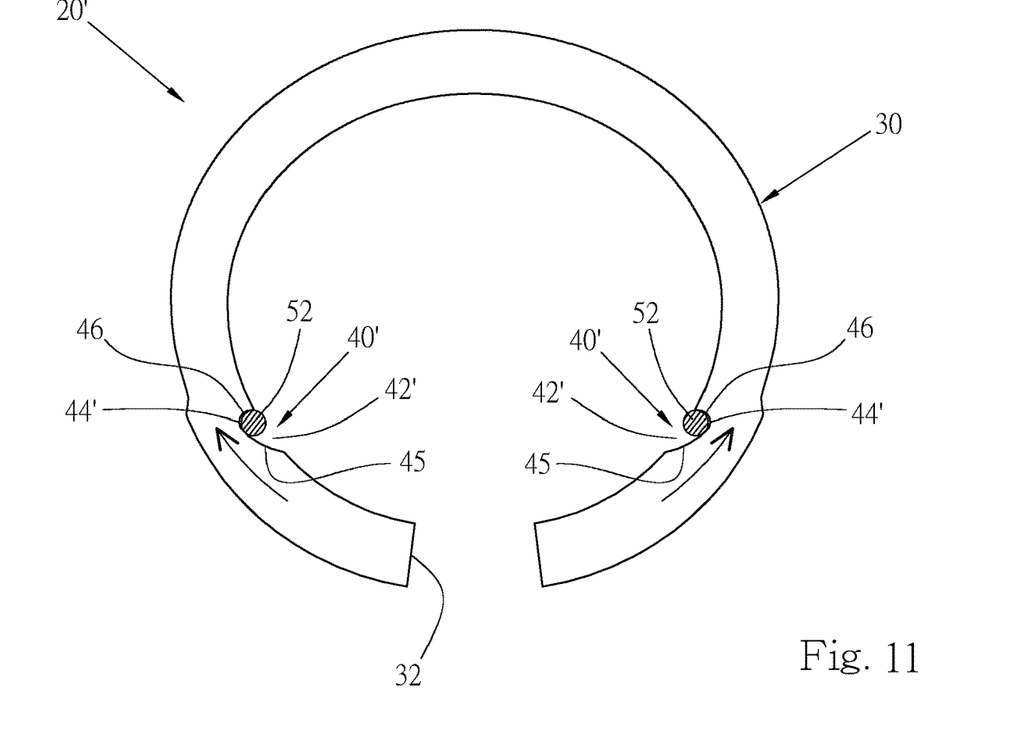
FIG. 11 shows the C-clip in FIG. 9 being operated with a retaining ring plier and being in a state of operation in which the outer diameter of the C-clip is being increased.
Figure 12:
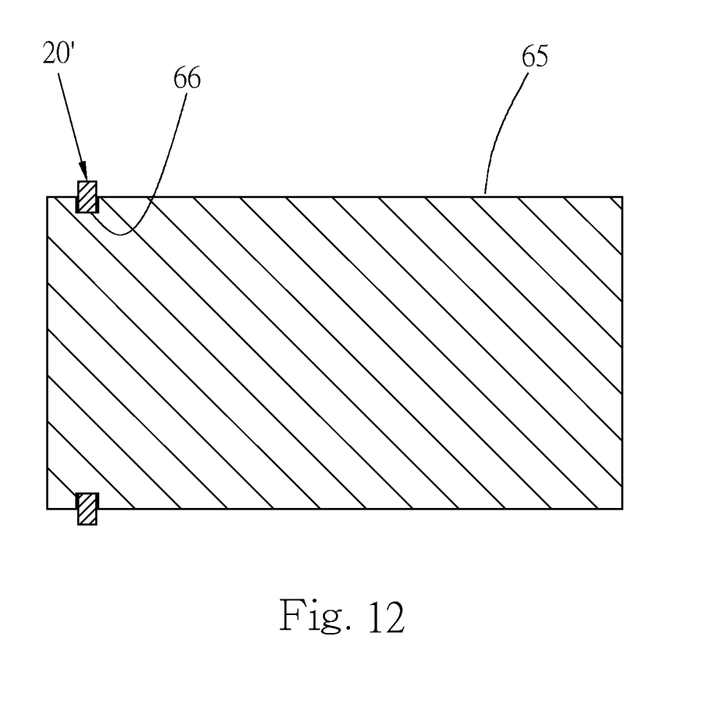
FIG. 12 is a sectional view showing the C-clip in FIG. 9 fitted around a shaft.

To use, referring to FIG. 11, the two tips 52 of the claws of a retaining ring plier are inserted into the two peripherally open holes 40' of the C-clip 20' respectively, and forces are applied through the plier to the C-clip 20' in order to change the outer diameter of the C-clip. The outer diameter of the clip body 30 can be increased by applying an outward opening force through each of the two tips 52 so that the C-clip 20' can be placed around an object, e.g., around the shaft 65 in FIG. 12. Once the outward opening forces are removed, the C-clip 20' restores its original shape elastically and ends up fitted in the circumferential groove 66 of the shaft 65.

Referring back to FIG. 10, in the course in which the outer diameter of the C-clip 20' is increased by the retaining ring plier 50, the tips 52 of the retaining ring plier are stopped by the stop edges (i.e., the outer walls 46) of the peripherally open holes 40' respectively and are thus kept from escaping from the peripherally open holes 40' respectively. This ensures that the tips 52 will not separate from the C-clip 20' during operation.

The C-clips 20 and 20' provided by the present invention are respectively provided with the peripherally open holes 40 and 40', which are configured to couple with and be operated by a retaining ring plier. As the outer peripheries of the C-clips 20 and 20' do not have conspicuous protruding portions, the convenience of use of the C-clips is enhanced in comparison with that of their prior art counterparts, and the C-clips can be used in more situations than their prior art counterparts. In addition, the peripherally open holes in the invention can prevent separation between a retaining ring plier and the C-clip operated by the plier and thus ensure effective operation.

The embodiments disclosed herein serve only to expound but not to limit the features of the present invention. All equivalent modifications of the invention shall fall within the scope of the patent protection sought by the applicant.

What is claimed is:

1. A C-clip, comprising:
    a C-shaped clip body able to be opened and closed elastically and having two ends, the two ends of the clip body being defined as a front side of the C-clip;
    two peripherally open holes provided at an inner periphery of the clip body and located on two lateral sides of the clip body respectively, wherein the two peripherally open holes are adjacent to or located at the two ends of the clip body respectively, and the clip body has an outer diameter changeable by applying forces to the clip body via the two peripherally open holes respectively;
    wherein each said peripherally open hole has a communication opening and a closed end, each said communication opening communicates with the inner periphery of the clip body, each said closed end has an inner wall and an outer wall, both connected to a corresponding said communication opening, and the outer wall of each said closed end forms a stop edge; and
    a center of the communication opening of each said peripherally open hole is closer to the front side of the C-clip than is the closed end of the each said peripherally open hole.

2. The C-clip of claim 1, wherein each of the two lateral sides of the clip body is provided with a narrow portion, and the narrow portions are portions of the clip body having narrowed widths, are adjacent to the two peripherally open holes respectively, and are on rear sides of the two peripherally open holes respectively.

3. The C-clip of claim 2, wherein each of the two lateral sides of the clip body is peripherally provided with at least one recess to form one of the two narrow portions.

4. The C-clip of claim 1, wherein each of the two peripherally open holes is provided in the clip body along a slanting direction.

5. The C-clip of claim 4, wherein the slanting direction of each said peripherally open hole is a direction between a tangential direction and a normal direction at a center of the communication opening of the each said peripherally open hole.

6. The C-clip of claim 1, wherein the two peripherally open holes are respectively provided on the two lateral sides of the clip body in a symmetric manner.

7. The C-clip of claim 6, wherein each of the two lateral sides of the clip body is provided with a narrow portion, and the narrow portions are portions of the clip body having narrowed widths, are adjacent to the two peripherally open holes respectively, and are on rear sides of the two peripherally open holes respectively.

8. The C-clip of claim 7, wherein each of the two lateral sides of the clip body is peripherally provided with at least one recess to form one of the two narrow portions.

9. The C-clip of claim 6, wherein each of the two peripherally open holes is provided in the clip body along a slanting direction.

10. The C-clip of claim 9, wherein the slanting direction of each said peripherally open hole is a direction between a tangential direction and a normal direction at a center of the communication opening of the each said peripherally open hole.

* * * * *